United States Patent
Mowatt et al.

(10) Patent No.: US 7,917,503 B2
(45) Date of Patent: Mar. 29, 2011

(54) SPECIFYING RELEVANCE RANKING PREFERENCES UTILIZING SEARCH SCOPES

(75) Inventors: David Mowatt, Seattle, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 12/015,514

(22) Filed: Jan. 17, 2008

(65) Prior Publication Data

US 2009/0187550 A1    Jul. 23, 2009

(51) Int. Cl.
    G06F 17/30    (2006.01)
(52) U.S. Cl. .......................... 707/723; 707/748
(58) Field of Classification Search ................. 707/1–3, 707/6–7, 705, 706, 723, 748, 752
See application file for complete search history.

(56) References Cited

U.S. PATENT DOCUMENTS

| | | | |
|---|---|---|---|
| 6,101,491 A * | 8/2000 | Woods | 1/1 |
| 7,080,059 B1 | 7/2006 | Poston et al. | |
| 7,219,073 B1 | 5/2007 | Taylor et al. | |
| 7,249,058 B2 * | 7/2007 | Kim et al. | 705/26 |
| 2002/0169754 A1 | 11/2002 | Mao et al. | |
| 2006/0074864 A1* | 4/2006 | Naam et al. | 707/3 |
| 2006/0136411 A1 | 6/2006 | Meyerzon et al. | |
| 2006/0218146 A1* | 9/2006 | Bitan et al. | 707/7 |
| 2006/0294100 A1 | 12/2006 | Meyerzon et al. | |
| 2007/0038601 A1 | 2/2007 | Guha | |
| 2007/0073641 A1 | 3/2007 | Perry et al. | |
| 2007/0083506 A1 | 4/2007 | Liddell et al. | |
| 2007/0112761 A1 | 5/2007 | Xu et al. | |
| 2007/0156663 A1 | 7/2007 | Slackman | |
| 2007/0219985 A1 | 9/2007 | Aravamudan et al. | |
| 2007/0239674 A1 | 10/2007 | Gorzela | |
| 2008/0126303 A1* | 5/2008 | Park et al. | 707/3 |
| 2009/0006356 A1* | 1/2009 | Liao et al. | 707/5 |
| 2009/0106235 A1* | 4/2009 | Tankovich et al. | 707/5 |
| 2009/0182723 A1* | 7/2009 | Shnitko et al. | 707/5 |
| 2009/0187537 A1* | 7/2009 | Yachin et al. | 707/3 |

OTHER PUBLICATIONS

Agichtein, et al., "Learning User Interaction Models for Predicting Web Search Result Preferences", SIGIR'06, ACM, 2006.
Agichtein, et al., "Improving Web Search Ranking by Incorporating User Behavior Information", SIGIR'06, ACM, 2006.
Kelly, et al., "Implicit Feedback for Inferring User Preference: A Bibliography", vol. 37, Issue 2, 2003.

* cited by examiner

*Primary Examiner* — Cam-Linh Nguyen (57) ABSTRACT

A mechanism for expressing a user preference to a set of documents based on user knowledge about the document corpora. The user preference input to the system can be positive, negative, or both. A set of documents that can be identified with a query can define a search scope definition. The search scope is mapped into an input ranking feature for a ranking function. The search scope definition is employed as a soft preference ranking feature, and thus, used to bias ranking via relevance feedback. The mechanism facilitates increasing or decreasing the final ranking score of a document based on whether the document falls into the user scope. The ranking weight can be configured by the user ad-hoc, or when relevance judgments are available, using machine learning techniques to find the optimal weights to optimize ranking.

20 Claims, 8 Drawing Sheets

SPECIFYING RELEVANCE RANKING PREFERENCES UTILIZING SEARCH SCOPES

BACKGROUND

A typical search engine serves user queries by retrieving most relevant documents containing the requested keywords from a vast set of possible candidates. The process of query resolution consists of two basic steps: determining the complete set of candidate documents that contain the keywords (also referred to as the filtered set of documents), and second, computing a ranking score for each of the documents in the filtered set, sorting the documents according to the ranking score, and retrieving the top N (typically 10-50) from the ranked list. The ranking score is determined by a ranking function, which is the core component of the search engine.

A ranking function takes multiple input values, also called features, that were extracted during the indexing process and maps all these features to a single numerical score. The features can be extracted from the document or the document metadata (e.g., term frequencies in the body of the document or in the metadata), or could be a result of more complicated analysis of the entire corpora with respect to the particular document (e.g., document frequency of the terms, aggregated anchor text, page rank, click distance, etc.). Generally, the ranking function grows monotonically, with the expected probability of the document being relevant given a particular query.

The ranking features can depend on the query (e.g., term frequency of the query term in the document), or be query independent (e.g., page rank, or in-degree or document type). The query-dependent features are called dynamic, and are computed at query time. The query-independent features are static, and can be pre-computed at index time. It is also possible to pre-compute the combination of all static features given a ranking model to save computation costs.

The ranking function is usually not hardcoded, and is designed to have many parameters that can be configured depending on the desired result. The set of parameters is called the ranking model. The ranking model parameters are typically the weights used to combine the input features into the ranking score. The weights can be tuned to optimize the performance of the ranking function with respect to some relevance metric.

Typically, the tuning is done offline over a dataset that consists of 100s-1000s of evaluation queries and a set of test documents that would be returned by the engine for these queries, with the corresponding ranking features extracted beforehand. An automatic tuner (e.g., neural net) can be employed that performs a search over the vast parameter space to optimize the relevance metric over the evaluation set. The resulting ranking model is then shipped with the product. For a consistent ranking every document has to be scored with the same ranking model, but this does not mean that the ranking model cannot change from query to query. Typically, though, the search engine has a single ranking model applied for all queries.

This approach implies that the set of features and the model itself are substantially fixed once the product is released. Moreover, the approach assumes that the evaluation dataset is representative of every possible corpora where the search engine can be used, which is clearly not true. In different environments users would like to customize the ranking, because of specialized domain knowledge the user has but was not considered when the evaluation dataset was built.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed technique provides the end-user with a mechanism for expressing a user preference to a set of documents based on user knowledge about the corpora. The user preference input to the system can be positive, negative, or both. For example, any document from site http://microsoft-.com could be preferred, or any document with the word "archive" in the URL or title is not preferred.

A set of documents that can be identified with a query can define a search scope. The search scope is mapped into an input ranking feature for a ranking function. Conventionally, a search scope defines the limits to the filtered set, or hard cut-off selection criteria for the set of documents returned to the user. Here, the search scope definition is employed as a soft preference ranking feature, and thus, used to bias ranking via relevance feedback.

This technique allows increasing or decreasing the final ranking score of a document based on whether the document falls into the user scope. The ranking weight can be configured by the user ad-hoc, or when relevance judgments are available, using machine learning techniques to find the optimal weights to optimize ranking. The presumption is that the user knowledge of URL space and prior knowledge about the usefulness of the documents will not be captured by the default ranking model and therefore will be beneficial for the overall relevance in a given network (corporate) environment.

The conversion of the scope to a static feature therefore comprises creating the static ranking feature data structures for each of the scopes, compiling the scope key, walking the scope key and setting the value of the corresponding static feature to one for every document in the key (and zero for everything else), identifying the ranking weight for the corresponding static feature, and ranking the documents.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

A mechanism for expressing a user preference to a set of documents based on user knowledge about the document corpora. The user preference input to the system can be positive, negative, or both. A set of documents that can be identified with a query can define a search scope definition. The search scope is mapped into an input ranking feature for a ranking function. The search scope definition is employed as a soft preference ranking feature, and thus, used to bias ranking via relevance feedback. The mechanism facilitates increasing or decreasing the final ranking score of a document based on whether the document falls into the user scope. The ranking weight can be configured by the user ad-hoc, or when relevance judgments are available, using machine learning techniques to find the optimal weights to optimize ranking.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
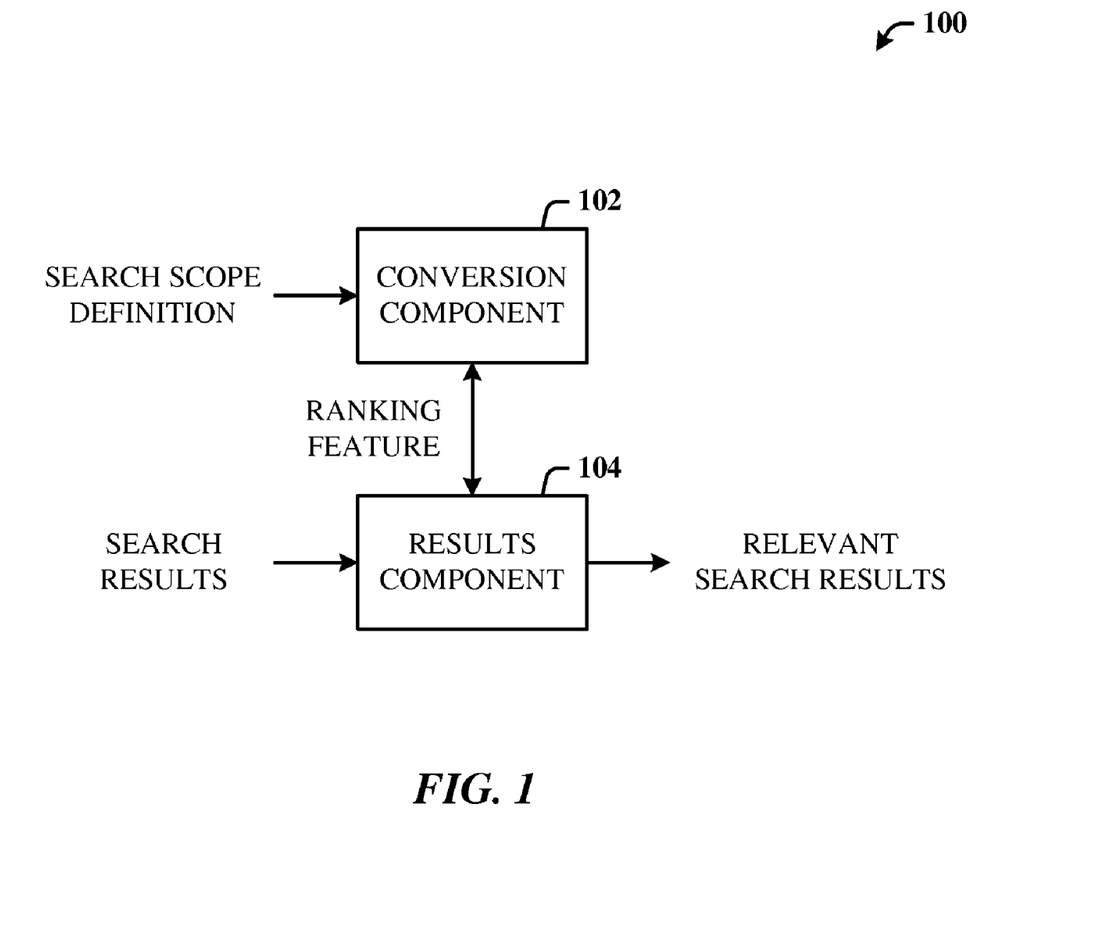
FIG. 1 illustrates a computer-implemented system that utilizes search scopes to specify relevance ranking preferences.

FIG. 1 illustrates a computer-implemented system 100 that utilizes search scopes to specify relevance ranking preferences. The system 100 includes a conversion component 102 for receiving and converting a scope definition into a ranking feature, the scope definition associated with a user search scope. A results component 104 applies the ranking feature to the search results to return results relevant to the user search scope.

Figure 2:
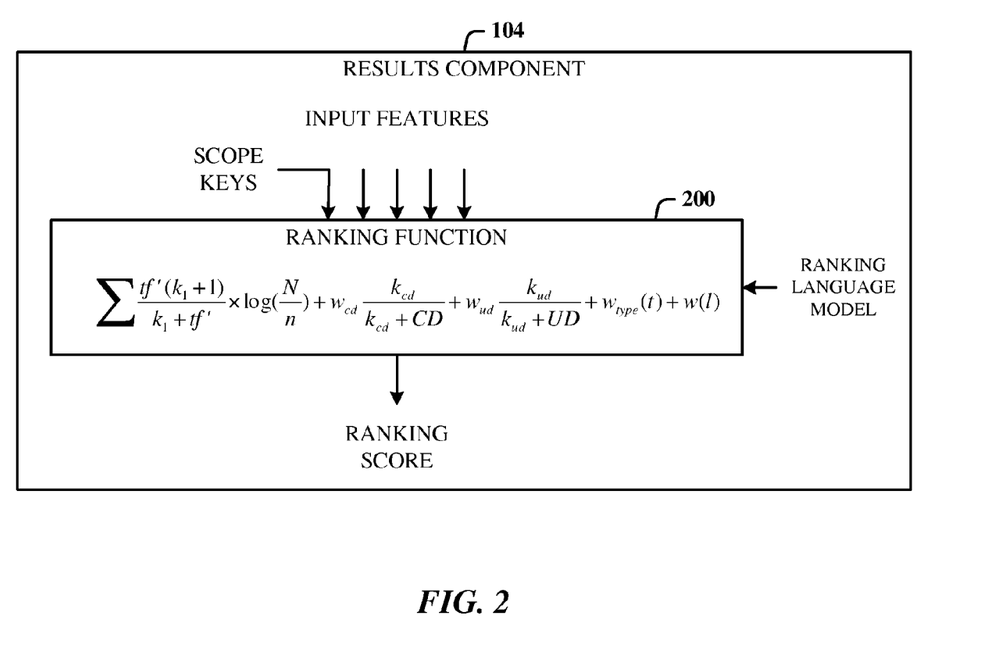
FIG. 2 illustrates that the results component can include a ranking function that receives scope keys as input features.

FIG. 2 illustrates that the results component 104 can include a ranking function 200 that receives scope keys as input features. The features are extracted during the indexing process and all the features are mapped to a single numerical score. The features can be extracted from the document or the document metadata (e.g., term frequencies in the body of the document or in the metadata), or could be a result of more complicated analysis of the entire corpora with respect to the particular document (e.g., document frequency of the terms, aggregated anchor text, page rank, click distance, etc.). Generally, the ranking function 200 grows monotonically, with the expected probability of the document being relevant given a particular query.

Following is a ranking function (e.g., BM25F) that can be employed for processing dynamic features. Dynamic rank features can be incorporated into the ranking score using this function. After the BM25F function, static features (QIR—query independent rank) are added. Optionally, weights from the static scope preferences can be added at the end of the function.

$$\sum \frac{tf'(k_1+1)}{k_1+tf'} \times \log\left(\frac{N}{n}\right) \text{ and,}$$

$$tf'_t = \sum_{p \in D} tf_{t,p} \cdot w_p \cdot \frac{1}{(1-b)+b\left(\frac{DL_p}{AVDL_p}\right)}$$

$$BM25F + QIR =$$

$$\sum \frac{tf'(k_1+1)}{k_1+tf'} \times \log\left(\frac{N}{n}\right) + w_{cd}\frac{k_{cd}}{k_{cd}+CD} + w_{ud}\frac{k_{ud}}{k_{ud}+UD} + w_{type}(t) + w(l)$$

where, the tf is the term frequency, DL is the document length, AVDL is the average document length, w is the property weight (a tunable parameter), $k_1$ is a tunable parameter, N is the number of documents in the corpora, b is a free parameter used for controlling document length normalization, n is the number of documents containing the term (the document frequency), CD is the click distance, UD is the URL depth, $w_{type}$ is the weight of the file type, and w(l) is the weight of the language. More sophisticated formulas may include neural networks, in which case each feature becomes an input to the neural net, and the neural net trains the weights.

The ranking input features can depend on the query (e.g., term frequency of the query term in the document), or be query independent (e.g., page rank, or in degree or document type). The query-dependent features are called dynamic, and are computed at query time. The query-independent features are static, and can be pre-computed at index time. It is also possible to pre-compute the combination of all static features given a ranking model to save computation costs.

Figure 3:
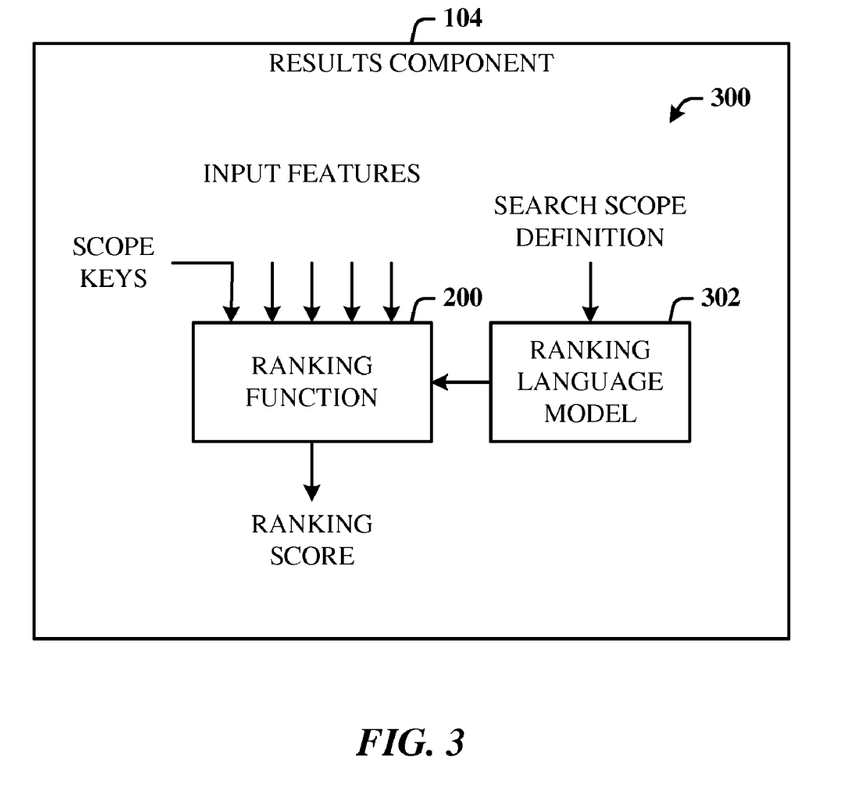
FIG. 3 illustrates that the results component can include a ranking subsystem where the scope definition can be utilized to influence the ranking language model.

FIG. 3 illustrates that the results component 104 can include a ranking subsystem 300 where the scope definition can be utilized to influence the ranking language model 302. In addition to converting scope definitions to a static feature, the scope definitions can be used to affect dynamic ranking features by affecting the weights of keywords with respect to the language model 302 obtained from inspecting the documents in the scope identified by the user. This is in contrast to the global language model of the corpora. The language model 302 identifies the overall importance of particular query terms, and therefore, can be biased depending on the scope the user chooses.

Compiling the language model 302 for the user-defined scope involves storing the term frequencies of each term in the crawled document in a property store (e.g., the first 1000 words), computing document frequencies of each term within documents that belong to a user scope, and modifying the IDF (inverse document frequency) term weights in the dynamic rank portion of the scoring function to take into account the document frequencies of the query terms in the search scope identified by the user.

Instead of the IDF weight log (N/n), a relevance weight with relevance feedback is employed, making the ranking function 200:

$$\sum \frac{tf'(k_1+1)}{k_1+tf'} \times \log\left(\frac{(r+0.5)(N-n-R+r+0.5)}{(R-r+0.5)(n-r+0.5)}\right) \text{ and,}$$

$$tf'_t = \sum_{p \in D} tf_{t,p} \cdot w_p \cdot \frac{1}{(1-b)+b\left(\frac{DL_p}{AVDL_p}\right)}, \text{ resulting in}$$

$$\sum \frac{tf'(k_1+1)}{k_1+tf'} \times \log\left(\frac{(r+0.5)(N-n-R+r+0.5)}{(R-r+0.5)(n-r+0.5)}\right) +$$

$$w_{cd}\frac{k_{cd}}{k_{cd}+CD} + w_{ud}\frac{k_{ud}}{k_{ud}+UD} + w_{type}(t) + w(l)$$

where, the tf is the term frequency, DL is the document length, AVDL is the average document length, w is the property weight (a tunable parameter), $k_1$ is a tunable parameter, N is the number of documents in the indexed corpora, b is a free parameter used for controlling document length normalization, n is the number of documents containing the term (the document frequency), r is the number of documents in the search scope containing the term, R is the size of the search scope (number of documents in the scope), CD is the click distance, UD is the URL depth, $w_{type}$ is the weight of the file type, and w(l) is the weight of the language. More sophisticated formulas may include neural networks, in which case each feature becomes an input to the neural net, and the neural net trains the weights.

Figure 4:
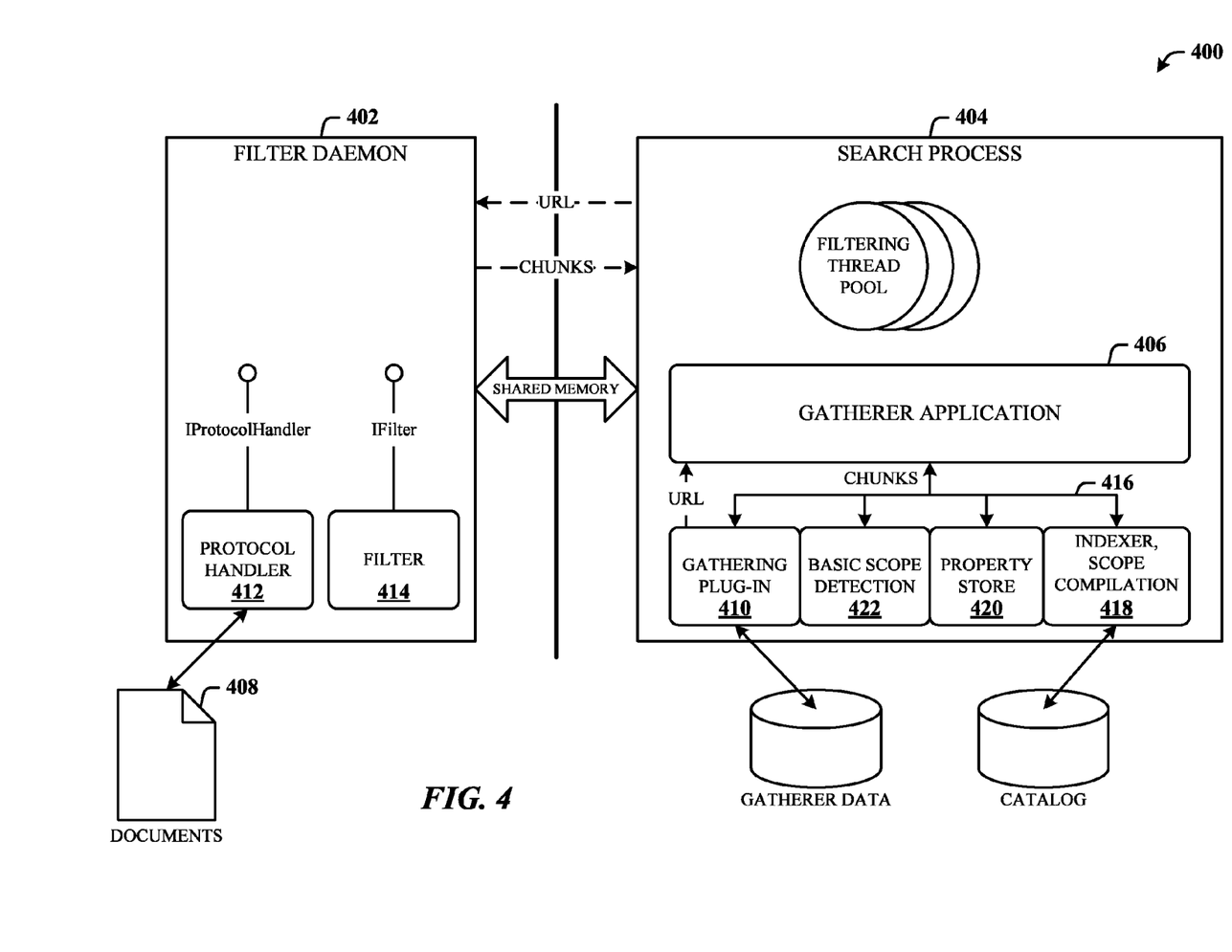
FIG. 4 illustrates a system for processing search results using the search scope definition to bias the search results.

FIG. 4 illustrates a system 400 for processing search results using the search scope definition to bias the search results. As illustrated, the system 400 includes a filter daemon 402 and a search process 404. The search process includes a gatherer application 406 that provides a generic mechanism for collecting searched for items such as documents 408 from multiple stores, various formats, and languages. The documents 408 are searched via the filter daemon 402. The gatherer application 406 receives a URL from a gathering plug-in 410 and sends the URL to the filter daemon 402, which is processed though a protocol handler 412 and filter 414.

The gathering plug-in 410 can be one of several gatherer pipeline plug-ins. The gathering plug-in 410 identifies properties that are included in a document such as the text from the title or body, and the file type associated with the document. The properties are gathered by gathering plug-in 410 as the documents 408 are crawled. In one embodiment, the functionality of gathering plug-in 410 identifies all the fields of a document and the associated properties including the language type of the document.

The gatherer application 406 digests document content into a unified format suitable primarily for building a full text index over the documents. A gatherer pipeline 416 provides multiple consumers with access to gathered documents. The pipeline 416 is an illustrative representation of the gathering mechanism for obtaining the documents or records of the documents for indexing. The pipeline 416 allows for filtering of data by various plug-ins (e.g., gathering plug-in 410) before the records corresponding to the data are entered into an index by an indexer and scope compilation component 418. The gatherer application 406 typically allows fetching the documents 408 once and processing the same data by multiple consumers.

A property store 420 includes anchor properties that have been gathered by gathering plug-in 410. For a particular document, the property store 420 includes a record of the file type that is associated with the document. For example, a record in property store 420 may include a document ID that identifies the document and the file type in separate fields. In other embodiments, other fields may be included in property store 420 that are related to a particular document.

A scope definition is a query pre-defined by the user. The basic scope definition is defined as including a URL prefix and/or a "property=value" clause. Multiple basic scopes can be combined into arbitrary complex (or compound) scopes via scope compilation. Basic scopes are detected at index time by a basic scope detection plug-in 422 that listens on the properties in the gatherer pipeline 416 and looks for property values matching basic scopes. Once a match is found the basic scope detection plug-in 422 emits a new property into the pipeline indicating to the indexer 418 that a scope key needs to be added to the index of the particular document. Compound scopes are compiled later during the index merge, and represent a query running against the index resulting in a new scope key created.

In addition to creating a scope key, the indexer 418 is instructed via a schema configuration to create a separate static ranking feature with the Boolean value of 1 if the document is in the scope, and 0, otherwise. A static feature can be represented in the index as an array of values indexed on the document ID (the array can be compressed, etc., to conserve memory). At query time when computing the rank of a document the engine looks up values of all static features by the document ID index.

The conversion of the scope to a static feature therefore comprises creating the static ranking feature data structures for each of the scopes, compiling the scope key, walking the scope key and setting the value of the corresponding static feature to one for every document in the key (zero for everything else), identifying the ranking weight for the corresponding static feature, and then ranking the documents. This scheme allows increasing or decreasing the final ranking score of a document based on whether it falls into the user scope.

The actual ranking weight can be configured by the user ad-hoc, or when relevance judgments are available, using machine learning techniques to find the optimal weights to optimize ranking. A presumption is that the user knowledge of URL space and prior knowledge about the usefulness of the documents is not captured by the default ranking model, and therefore, will be beneficial for the overall relevance in a given network (e.g., corporate) environment.

The scopes can be defined globally by the administrator. The scopes can also be defined by the user, in which case scope biasing becomes a form of personalization. Different scopes can be associated with different users based on properties in the user profile store. For example, users in an operating system (OS) division can automatically have queries associated with an 'OS relevance scope'. Similarly, users in Redmond can be assigned a "main campus relevance scope", as opposed to "Europe relevance scope". Still further, the scope(s) can be identified by the job disciplines, gender, nationality, or demographics, for example.

Additionally, a basic set of modifiable scope definitions can be shipped with a software product, yet arbitrarily be made more complex by the end-user, and still be applied for relevance bias. For example, scopes defining a set of new documents ("changed in last 30 days") can be interesting for relevance.

In an alternative embodiment, predefined classes of scopes are automatically generated for each user or class of users and automatically associated with the user's query (e.g., all sites which the user publishes to, most-frequently browses to, etc.). Another predefined scope class can include sites that the user links to from a personal page, all sites of which can be included in the automatic personal scope and force the search engine to prefer documents from these sites.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
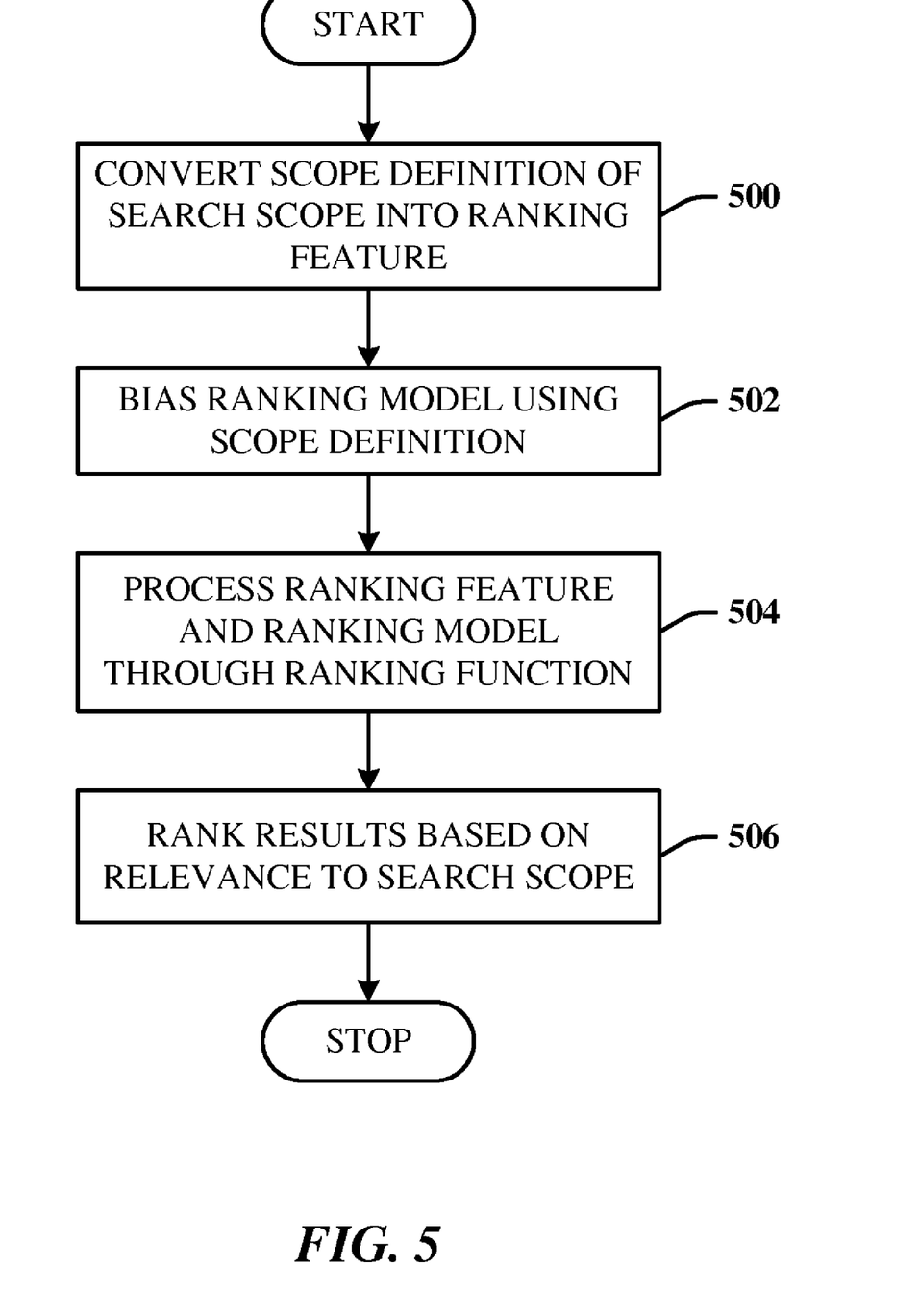
FIG. 5 illustrates a computer-implemented method of processing search results.

FIG. 5 illustrates a computer-implemented method of processing search results. At 500, a scope definition is converted into a ranking feature. The ranking feature is one of multiple features that can be input to a ranking function. At 502, a ranking model is biased using the scope definition. At 504, the ranking feature and the ranking model are processed through the ranking function. At 506, the search results are ranked based on relevance to the search, as determined by the ranking feature and the biased ranking model.

Figure 6:
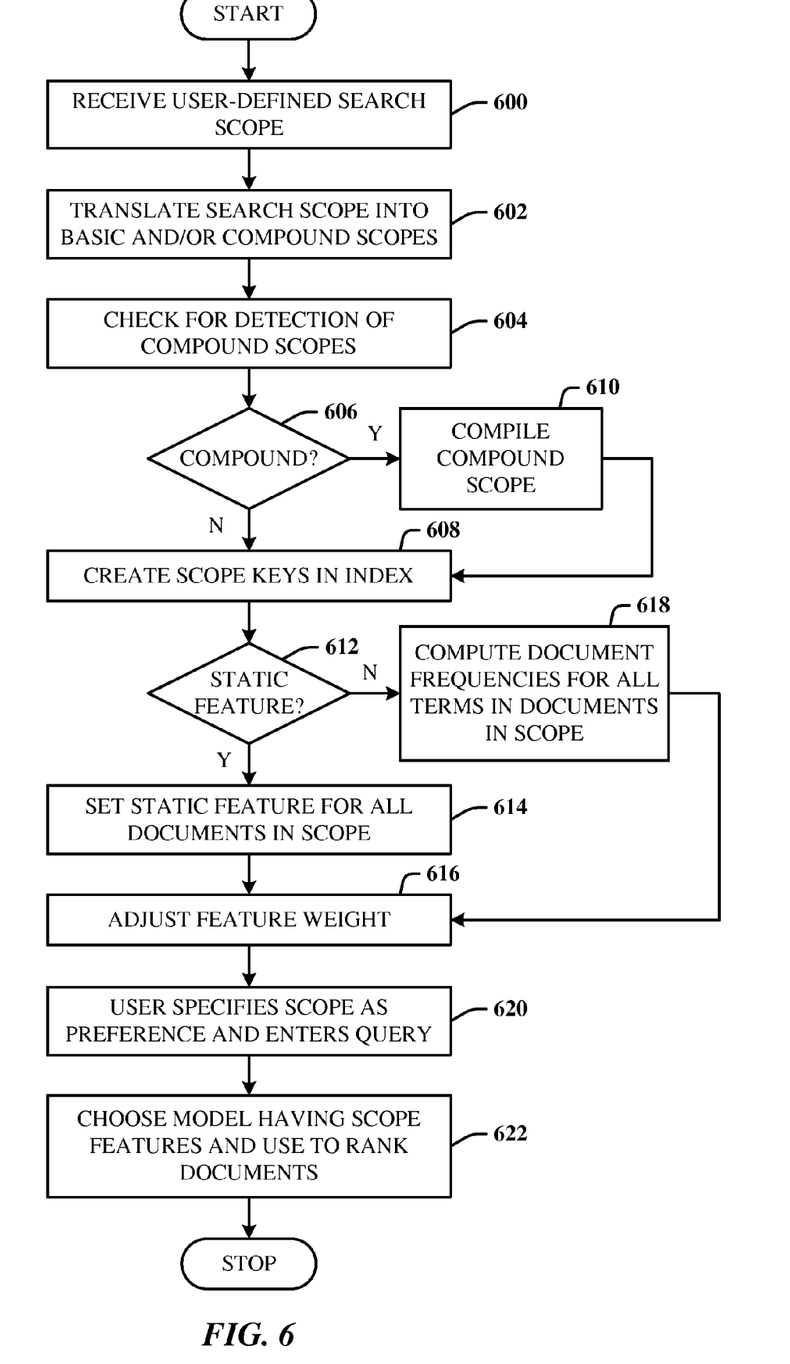
FIG. 6 illustrates a method of converting a search scope into a static feature.

FIG. 6 illustrates a method of converting a search scope into a static feature. At 600, a user-defined search scope is received. At 602, the search scope is translated into basic and/or compound scopes. At 604, a check is made for detection of compound scopes in the translation. If a compound scope is not found, at 606, flow is to 608 to create scope keys in a document index. Alternatively, if a compound scope is found, flow is from 606 to 610 to compile the compound scope. Flow is then to 608 to create the scope keys in the index. At 612, a check is made for a static feature in the index, and if found, flow is to 614 to set the static feature to a value (e.g., Boolean one) for all documents in the search scope. At 616, the feature weight is adjusted. Alternatively, at 612, if when the check is made for a static feature in the index, and not found, flow is to 618 to compute the document frequencies for all terms in the documents in scope. Flow is then to 616 to adjust the feature weights. It is noted that adjusting the weight of a static feature is technically different than adjusting the IDF for a dynamic feature in the BM25F ranking function. At 620, the user specifies the scope as a preference and enters a query. At 622, a ranking model is selected having scope features, and is used to rank the documents.

Figure 7:
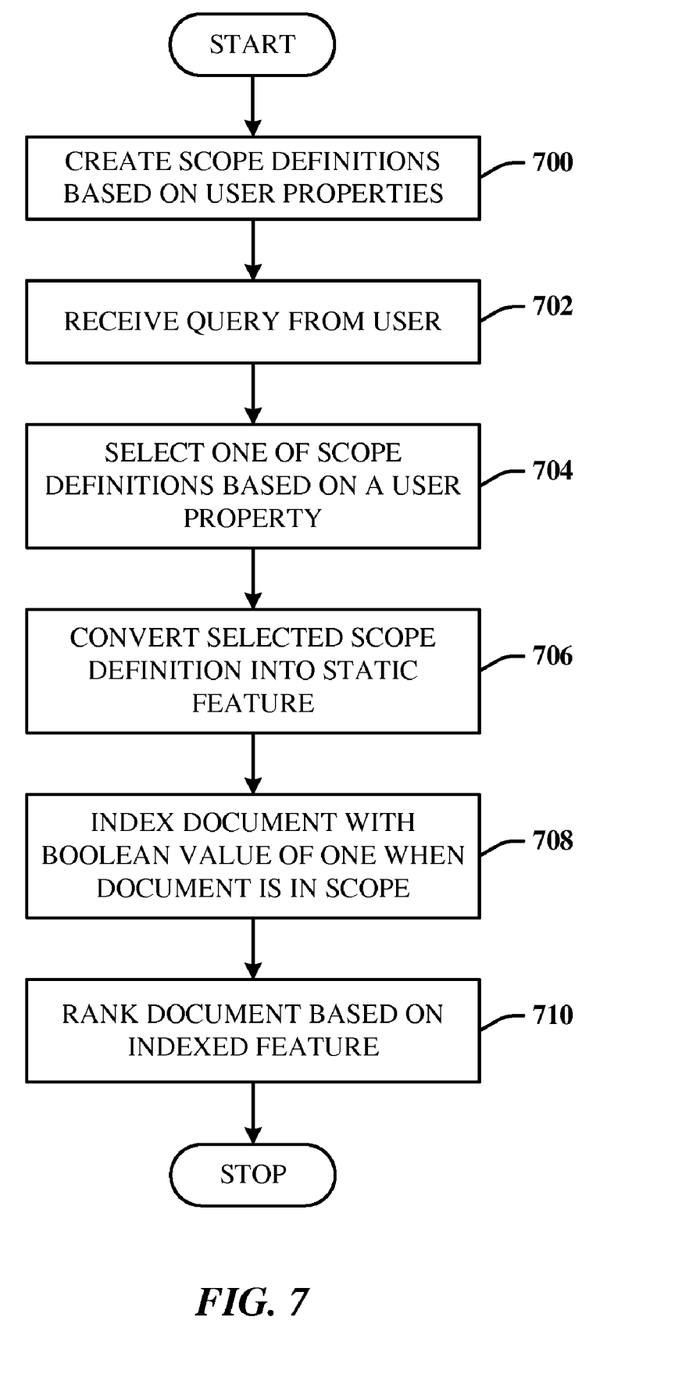
FIG. 7 illustrates a method of biasing search results based on user properties.

FIG. 7 illustrates a method of biasing search results based on user properties. At 700, one or more scope definitions are created based on user properties. At 702, a query is received from the user. At 704, one or more of the scope definitions are selected based on a user property. At 706, the selected scope definition(s) are converted into static rank features. At 708, a document is indexed with a Boolean value of one when the document is in scope. At 710, the document is ranked based on the indexed feature.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
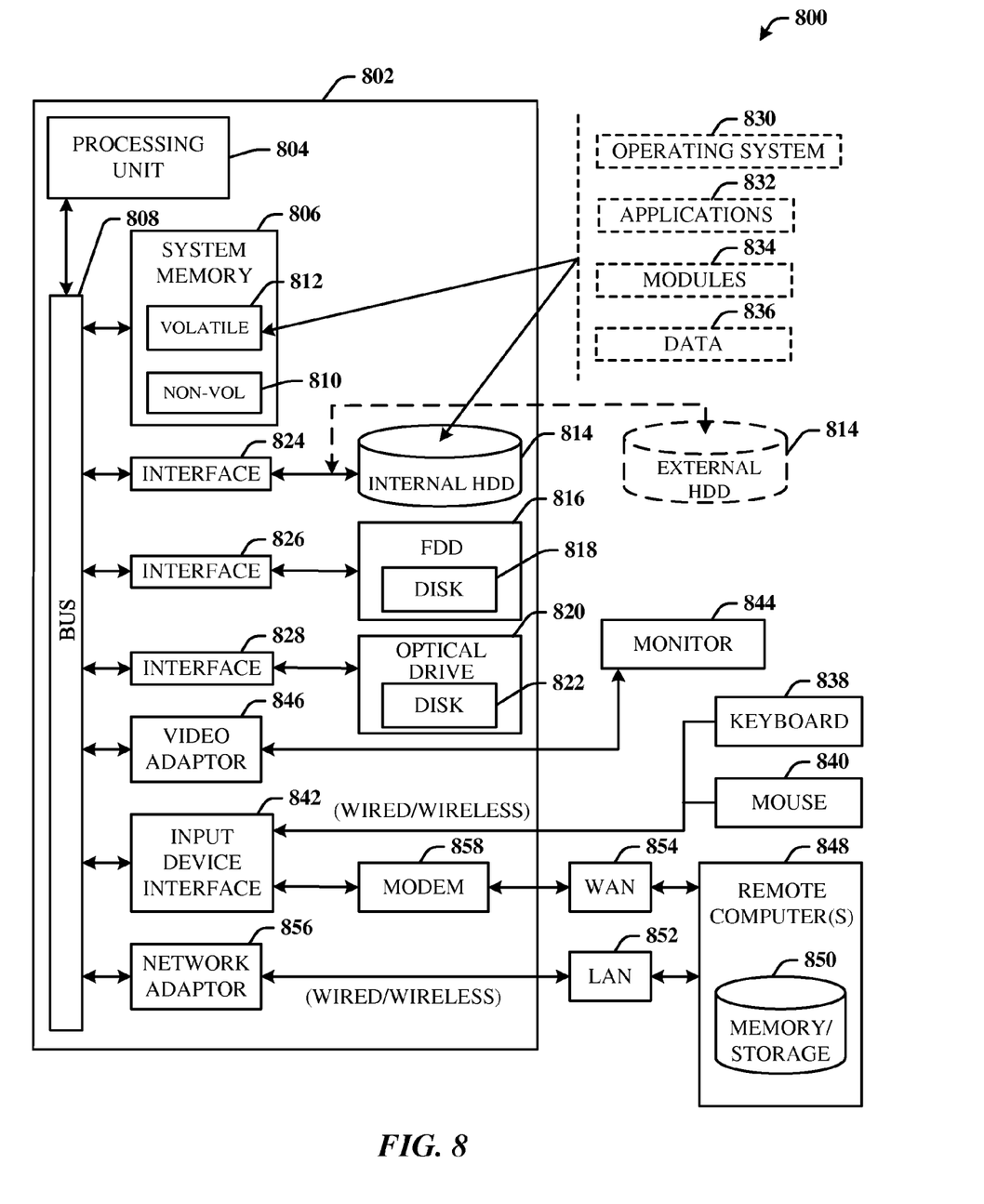
FIG. 8 illustrates a block diagram of a computing system operable to execute in accordance with the disclosed architecture.

Referring now to FIG. 8, there is illustrated a block diagram of a computing system 800 operable to execute in accordance with the disclosed architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS stores the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD).

The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The one or more application programs 832, other program modules 834, and program data 836 can include the conversion component 102, results component 104, search scope definition, ranking feature, search results, relevant search results, ranking function 200, ranking function subsystem 300, ranking language model 302, and system 400, for example.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   a conversion component for receiving and converting a scope definition into a ranking feature used to bias ranking via relevance feedback, the scope definition is defined by a set of documents identified with a user query associated with a user search scope, the scope definition includes at least one of a URL prefix or a "property=value" clause;
   a results component for applying the ranking feature to the search results to return results relevant to the user search scope, the results component further comprises a ranking function that receives scope keys as input features, which features are extracted during an indexing process and mapped to a single numerical score; and a processor that executes computer-executable instructions associated with at least the conversion component and the results component.

2. The system of claim 1, wherein the ranking feature is static.

3. The system of claim 1, wherein the ranking feature is dynamic.

4. The system of claim 1, wherein the scope definition includes a basic scope or a compound scope.

5. The system of claim 1, wherein the scope definition is defined globally to a query for enterprise administration or on a per-user basis.

6. The system of claim 1, wherein the results component includes a ranking language model biased by the scope definition.

7. A computer-implemented system comprising:
a conversion component for receiving and converting a scope definition into a ranking feature, the scope definition is defined by a set of documents identified with a user query and associated with a user search scope;
a results component for applying the ranking feature to the search results and the scope definition to a ranking model to return results relevant to the user search scope, the results component further comprises a ranking function that receives scope keys as input features, which features are extracted during an indexing process and mapped to a single numerical score; and
a processor that executes computer-executable instructions associated with at least the conversion component or the results component.

8. The system of claim 7, wherein the scope definition is generated for a user or class of users and automatically applied to a query of the user or class of users.

9. The system of claim 7, wherein the ranking function is for processing static and dynamic features, the ranking function defined as:

$$\sum \frac{tf(k_1+1)}{k_1+tf} \times \log\left(\frac{N}{n}\right) + w_{cd}\frac{k_{cd}}{k_{cd}+CD} + w_{ud}\frac{k_{ud}}{k_{ud}+UD} + w_{type}(t) + w(l),$$

where, the tf is the term frequency, DL is the document length, AVDL is the average document length, w is the property weight (a tunable parameter), $k_1$ is a tunable parameter, N is the number of documents in the corpora, b is a free parameter used for controlling document length normalization, n is the number of documents containing the term (the document frequency), CD is the click distance, UD is the URL depth, $w_{type}$ is the weight of the file type, and w(l) is the weight of the language.

10. The system of claim 7, wherein the ranking feature includes a value that differentiates if a document is in the search scope.

11. A computer-implemented method of processing search results, comprising acts of:
converting a scope definition defined by a set of documents identified with a user query and associated with a search scope into a ranking feature that is one of query dependent or query independent;
biasing a ranking model using the scope definition;
processing the ranking feature and the ranking model through a ranking function that receives scope keys as multiple input values that are mapped to a single numerical score;
ranking the results based on relevance to the search scope; and
utilizing a processor that executes instructions stored in memory to perform at least one of the acts of converting, biasing, processing, or ranking.

12. The method of claim 11, further comprising automatically associating the scope definition with a user and processing the scope definition for a query of the user.

13. The method of claim 11, further comprising generating and adding a scope key to a document index.

14. The method of claim 11, further comprising biasing weights of keywords in the ranking model employed by the ranking function using the scope definition.

15. The method of claim 11, further comprising increasing or decreasing a final ranking score of a document in the results based on relevance of the document to the search scope.

16. The method of claim 11, further comprising detecting a scope at index time and adding the scope keys to a document index.

17. The method of claim 11, further comprising selecting a new search scope and biasing the ranking model used for obtaining the results based on a new scope definition associated with the new search scope.

18. The method of claim 11, further comprising modifying inverse document frequency weights in a dynamic rank portion of the ranking function to account for document frequencies of query terms in the search scope.

19. The method of claim 11, further comprising associating the scope definition with a property of a user such that the scope definition is selected at query time and the results are ranked based on the user property.

20. The method of claim 11, further comprising computing document frequencies for each term in documents of the search scope.

* * * * *